UNITED STATES PATENT OFFICE.

KARL SCHWICKERATH, OF DETROIT, MICHIGAN.

COMPOUND OF NUCLEIN AND MERCURY.

SPECIFICATION forming part of Letters Patent No. 637,355, dated November 21, 1899.

Application filed October 6, 1898. Serial No. 692,783. (No specimens.)

*To all whom it may concern:*

Be it known that I, KARL SCHWICKERATH, a subject of the King of Prussia, Emperor of Germany, residing at Detroit, county of Wayne, State of Michigan, have invented a certain new and useful Improvement in Processes of Preparing Compounds of Nuclein and Mercury; and I declare the following to be a full, clear, and exact description of the invention, such as will enable others skilled in the art to which it pertains to make and use the same.

My invention relates to the process for and the manufacture of a new soluble compound of nuclein and mercury not heretofore known; and it consists in the process and the compound as an article of manufacture, as hereinafter described and claimed.

In order to form this compound, I take a solution of about three hundred grams of nuclein dissolved in a sufficient quantity of water—say about six liters—to which is added an excess of alkali—say about sixty grams of sodium carbonate. To this I add a solution of about fifty-five grams of mercuric chloride dissolved in a sufficient quantity of water. To this mixed solution I add a sufficient quantity of alcohol and a concentrated solution of a neutral salt (as sodium chloride) to precipitate the combination of nuclein and mercury. The reaction which takes place on adding to the solution of nuclein containing an excess of alkali the mercuric bichloride solution is the formation of mercuric oxide, that combines *in statu nascendi* with the nuclein, forming the combination of nuclein and mercury set forth and which is thereafter precipitated, substantially as set forth.

This nuclein-mercury compound exists in the form of a whitish powder, readily soluble in water, especially in hot water, and contains about ten per cent. of metallic mercury. The watery solution has a distinct metallic taste, is not changed or altered by boiling, and can be added to albuminous liquid without coagulation taking place. These properties and the pronounced bactericidal power of the compound render it of great value as an antiseptic and antisyphilitic agent.

The compound may be used both as a topical application and as an internal remedy. If used as a topical application, it may be in the form of a wash or mixed with any appropriate substance, as an ointment. If used as an internal remedy, I regard two grains as a safe dose.

What I claim is—

1. The herein-described method of preparing a compound of nuclein and mercury, consisting in adding to an alkaline solution of nuclein a soluble mercuric salt in solution, precipitating the resultant nuclein-mercury, separating the precipitate, and washing and drying it, substantially as described.

2. As a new article of manufacture, a compound of nuclein and mercury, soluble in water and containing about ten per cent. of mercury, substantially as described.

In testimony whereof I sign this specification in the presence of two witnesses.

KARL SCHWICKERATH.

Witnesses:
R. A. PARKER,
MARION A. REEVE.